United States Patent
Lee et al.

(10) Patent No.: US 10,279,457 B2
(45) Date of Patent: May 7, 2019

(54) CYLINDER HEAD PALLET

(71) Applicant: Hyundai Motor Company, Seoul (KR)

(72) Inventors: Young Seok Lee, Ulsan (KR); Do Kyoung Ji, Ulsan (KR); Jun Hyeok Bae, Ulsan (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 15/208,966

(22) Filed: Jul. 13, 2016

(65) Prior Publication Data
US 2017/0136607 A1    May 18, 2017

(30) Foreign Application Priority Data

Nov. 18, 2015  (KR) .................. 10-2015-0161947

(51) Int. Cl.
| | | |
|---|---|---|
| *B23Q 1/01* | (2006.01) | |
| *B25H 1/00* | (2006.01) | |
| *F02F 1/24* | (2006.01) | |
| *F02F 7/00* | (2006.01) | |
| *B25B 11/02* | (2006.01) | |

(52) U.S. Cl.
CPC ............. *B25B 11/02* (2013.01); *B23Q 1/01* (2013.01); *B25H 1/0007* (2013.01); *F02F 7/0082* (2013.01); *F02F 1/24* (2013.01); *F02F 2200/00* (2013.01)

(58) Field of Classification Search
CPC .......... B23Q 1/035; B23Q 1/037; B23Q 1/25; B25B 11/02; B25H 1/0007; B62D 65/00; B62D 65/02; B62D 65/026; B62D 65/04; B62D 65/10; B62D 19/38; B62D 19/44; F02F 7/0082; Y10T 29/49998
See application file for complete search history.

(56) References Cited

U.S. PATENT DOCUMENTS

| | | | | |
|---|---|---|---|---|
| 1,469,734 A | * | 10/1923 | Staley ................. | B25H 1/0007 269/296 |
| 3,315,800 A | * | 4/1967 | Wagner ................ | B65D 19/16 108/55.1 |
| 3,719,356 A | * | 3/1973 | Winstead .............. | B23Q 1/01 269/292 |
| 4,583,631 A | * | 4/1986 | Yonezawa ............ | B23Q 1/0018 198/345.3 |
| 4,977,836 A | * | 12/1990 | Bond ................... | B65D 19/44 108/55.1 |
| 5,026,033 A | * | 6/1991 | Roxy ................... | B23Q 3/103 269/309 |
| 5,107,599 A | * | 4/1992 | Marincic .............. | G01B 5/0004 269/309 |

(Continued)

FOREIGN PATENT DOCUMENTS

| | | |
|---|---|---|
| JP | 3279119 B2 | 4/2002 |
| JP | 3969934 B2 | 9/2007 |

(Continued)

*Primary Examiner* — Tyrone V Hall, Jr.
(74) *Attorney, Agent, or Firm* — Mintz Levin Cohn Ferris Glovsky and Popeo, P.C.; Peter F. Corless

(57) ABSTRACT

A cylinder head pallet includes: a base plate; a subplate disposed upwardly of the base plate, spaced apart from the base plate, and having a first surface and a second surface that oppose each other; and a plurality of posts installed on the first surface and the second surface of the subplate to support a cylinder head.

13 Claims, 11 Drawing Sheets

(56) References Cited

U.S. PATENT DOCUMENTS

| | | | | |
|---|---|---|---|---|
| 5,305,992 A | * | 4/1994 | Kish | B23Q 1/035 269/228 |
| 5,497,708 A | * | 3/1996 | Jeruzal | B65D 19/44 108/54.1 |
| 5,944,303 A | * | 8/1999 | Reed | B25H 1/0007 269/289 R |
| 6,644,637 B1 | * | 11/2003 | Shen | B25B 5/061 269/152 |
| 7,077,067 B2 | * | 7/2006 | Bodde | B65D 19/44 108/55.1 |
| 9,421,655 B2 | | 8/2016 | Hacker et al. | |
| 9,540,181 B2 | * | 1/2017 | Ghirardi | B25H 1/00 |
| 2010/0140860 A1 | * | 6/2010 | Gao | B62D 65/10 269/311 |
| 2012/0175832 A1 | * | 7/2012 | Hacker | B25B 5/061 269/53 |
| 2014/0042681 A1 | * | 2/2014 | Kooney | B25B 11/002 269/8 |
| 2014/0259663 A1 | * | 9/2014 | Scelsi | B25H 1/0007 29/888.01 |

FOREIGN PATENT DOCUMENTS

| | | |
|---|---|---|
| KR | 10-0133210 B1 | 4/1998 |
| KR | 20-0395662 Y1 | 9/2005 |
| KR | 10-0830650 B1 | 5/2008 |
| KR | 2011-0001508 A | 1/2011 |
| KR | 10-1072322 B1 | 10/2011 |

\* cited by examiner

CYLINDER HEAD PALLET

CROSS-REFERENCE TO RELATED APPLICATION

This application claims the benefit of and priority to Korean Patent Application No. 10-2015-0161947, filed on Nov. 18, 2015 in the Korean Intellectual Property Office, the disclosure of which is incorporated herein in its entirety by reference.

TECHNICAL FIELD

The present disclosure relates generally to a cylinder head pallet and, more particularly, to a cylinder head pallet capable of flexibly dealing with types and assembly postures of cylinder heads.

BACKGROUND

It is well known that most engines have a cylinder block and a cylinder head, and the cylinder head is positioned above the cylinder block. Various accessories such as an intake valve, an exhaust valve, a cam carrier, a cam cap, a stud, and a cotter may be assembled to the cylinder head.

A cylinder head pallet can be used in an assembly process of the cylinder head. The cylinder head pallet has a base plate and a plurality of support posts supporting the cylinder head on the base plate.

However, in a conventional cylinder head pallet, the plurality of posts supporting the cylinder head are fixedly disposed according to each type of a cylinder head. Thus, the cylinder head pallet cannot be used for assembling a different type of cylinder head or a cylinder head having a changed structure. Also, the conventional cylinder head pallet may not be capable of flexibly coping with assembly postures (e.g., TOP UP, TOP DOWN, etc.) by types. In addition, the conventional cylinder head pallet has a complicated structure causing positions of the posts to change in order to avoid interference when assembling accessories.

SUMMARY

The present disclosure has been made to solve the above-mentioned problems occurring in the related art while advantages achieved by the related art are maintained intact.

An aspect of the present disclosure provides a cylinder head pallet capable of flexibly dealing with types and assembly postures of cylinder heads, thus being easily utilized in assembling various types of cylinder heads and a cylinder head having a changed structure.

According to embodiments of the present disclosure, a cylinder head pallet includes: a base plate; a subplate disposed upwardly of the base plate, spaced apart from the base plate, and having a first surface and a second surface that oppose each other; and a plurality of posts installed on the first surface and the second surface of the subplate to support a cylinder head.

The cylinder head pallet may further include: a plurality of supports installed to protrude upwardly from an upper surface of the base plate, wherein the base plate is supported by the plurality of supports.

The subplate may be detachably mounted on the plurality of supports.

The plurality of posts may be disposed to support two or more types of cylinder heads.

The subplate may have a first opening having a predetermined area and extending through the first surface and the second surface.

The subplate may have a pair of second openings symmetrically provided on both sides of the first opening.

At least one of the plurality of posts may have a reference pin protruding from an upper surface thereof, and upper surfaces of the other posts may be flat.

The plurality of posts may include a plurality of first posts protruding from the first surface of the subplate and having a first length; a plurality of second posts protruding from the first surface of the subplate and having a second length shorter than the first length; and a plurality of third posts protruding from the second surface of the subplate and having a third length.

The base plate may have an opening having a predetermined area.

The cylinder head pallet may further include: a nest for a cam cap installed on the base plate and allowing different types of cam caps to be mounted thereon.

The base plate may further include a plurality of second supports installed to protrude upwardly, and the nest for the cam cap may be disposed upwardly of the base plate and spaced apart from the base plate by the plurality of second supports.

The cylinder head pallet may further include: a nest for a cam carrier installed on the base plate and allowing a cam carrier to be mounted thereon.

Furthermore, according to embodiments of the present disclosure, a cylinder head pallet includes: a base plate; a rotatable subplate disposed upwardly of the base plate and spaced apart from the base plate; and a plurality of posts protruding from an upper surface and a lower surface of the subplate and selectively supporting two or more types of cylinder heads, wherein a reference portion may be formed to define a rotation axis of the subplate on at least one surface of the subplate.

The reference portion may include at least one pair of bushes symmetrically formed on both left and right sides of the subplate, and the at least one pair of bushes may have an insertion recess.

The subplate may have an opening having a predetermined area and extending through the subplate vertically.

BRIEF DESCRIPTION OF THE DRAWINGS

The above and other objects, features and advantages of the present disclosure will be more apparent from the following detailed description taken in conjunction with the accompanying drawings.

Figure 1:
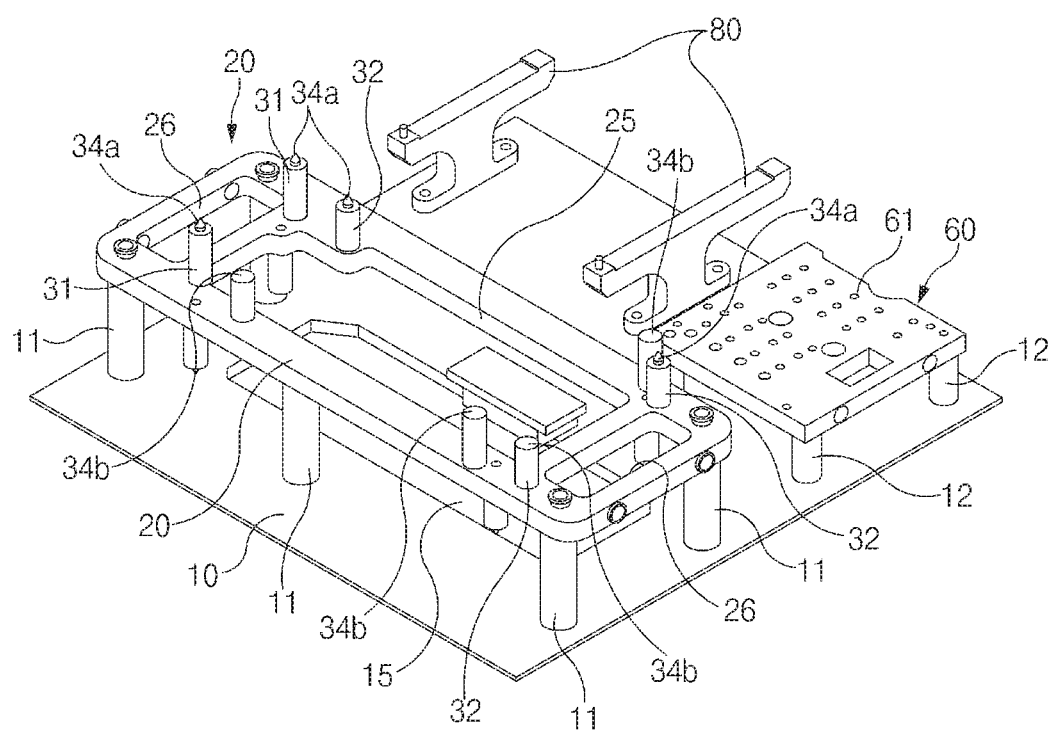
FIG. 1 is a perspective view illustrating a cylinder head pallet according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present disclosure, and may be altered according to the intent of a user or operator, or conventional practice. Therefore, the terms should be defined on the basis of the entire content of this specification.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to the presently disclosed embodiments, FIG. 1 is a perspective view illustrating a cylinder head pallet according to embodiments of the present disclosure. As shown in FIG. 1, a cylinder head pallet according to embodiments of the present disclosure may include a base plate 10 and a subplate 20 installed to be disposed upwardly of the base plate 10 and spaced apart from the base plate 10.

The base plate 10 may have a flat upper surface, and an opening 15 may be provided on one side of the base plate 10.

A plurality of supports 11 may be provided on the upper surface of the base plate 10 and protrude upwardly. As the plurality of supports 11 support the subplate 20, the subplate 20 may be installed to be upwardly spaced apart from one side of the base plate 10.

The subplate 20 may have a first surface 21 and a second surface 22 that oppose each other, and a plurality of posts 31, 32, and 33 may be installed on the first surface 21 and the second surface 22. The subplate 20 may be detachably installed on the plurality of supports 11. Thus, the subplate 20 may be reversed by 180° and supported by the plurality of supports 11, and accordingly, the first surface 21 and the second surface 22 of the subplate 20 may be selectively positioned to face upwards.

The plurality of posts 31, 32, and 33 may be appropriately disposed to support two or more types of cylinder heads. At least one of the plurality of posts 31, 32, and 33 may have a reference pin 34a protruding from an upper surface thereof, and upper surfaces of the other posts may be flat surfaces 34b. Accordingly, when a cylinder head is supported by the plurality of posts 31, 32, and 33, a support position of the cylinder head may be accurately set based on the reference pin 34a.

The plurality of posts 31, 32, and 33 may include a plurality of first posts 31 provided on the first surface 21 of the subplate 20, a plurality of second posts 32 provided on the first surface 21 of the subplate 20, and a plurality of third posts 33 provided on the second surface 22 of the subplate 20.

Figure 3:
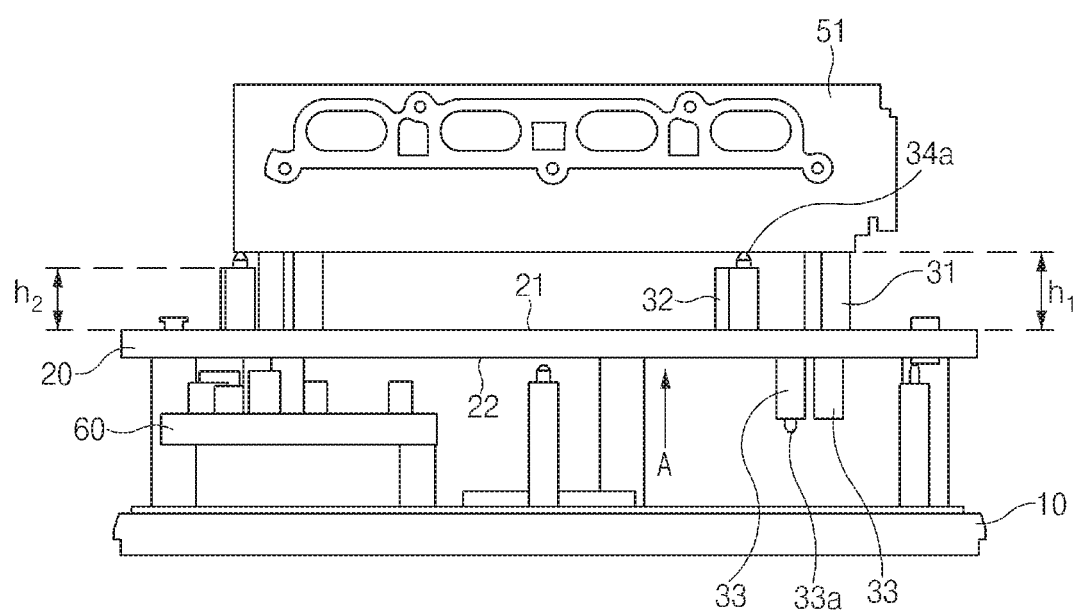
FIG. 3 is a front view illustrating a state in which a certain type of cylinder head is supported by a first post of a subplate of a cylinder head pallet according to embodiments of the present disclosure.
Figure 4:
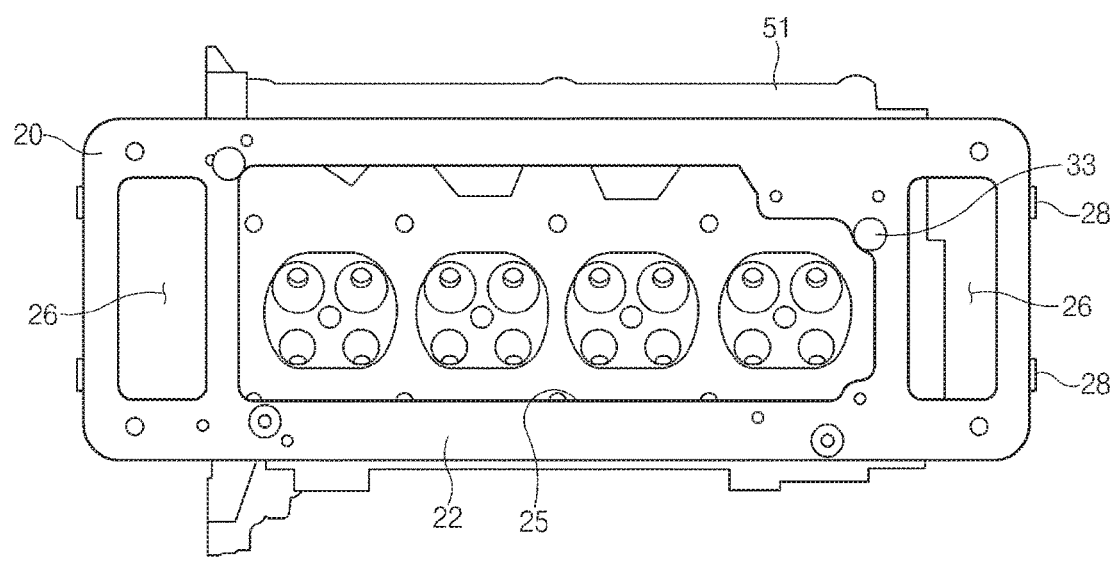
FIG. 4 is a bottom view illustrating a state in which a certain type of cylinder head is supported by a first post of a subplate, viewed in a direction indicated by the arrow "A" of FIG. 3.

The plurality of first posts 31 may protrude from the first surface 21 of the subplate 20 and have a first length h1. For example, as illustrated in FIGS. 3 and 4, a cylinder head 51 of the Nu Engine may be supported by the plurality of first posts 31.

Figure 5:
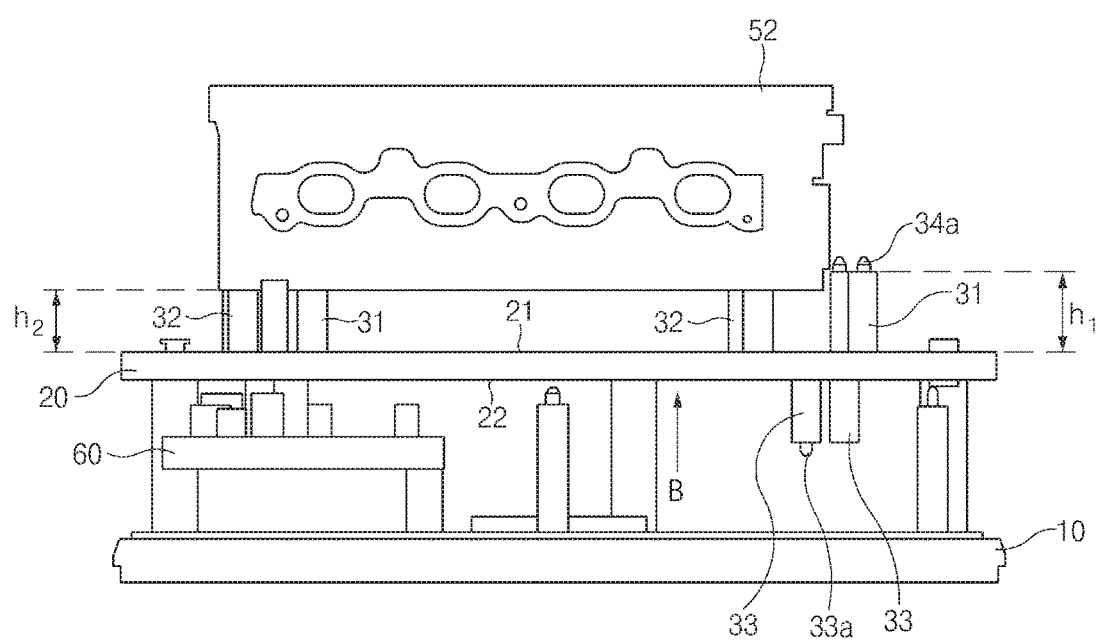
FIG. 5 is a front view illustrating a state in which a different type of cylinder head is supported by a second post of a subplate of a cylinder head pallet according to embodiments of the present disclosure.
Figure 6:
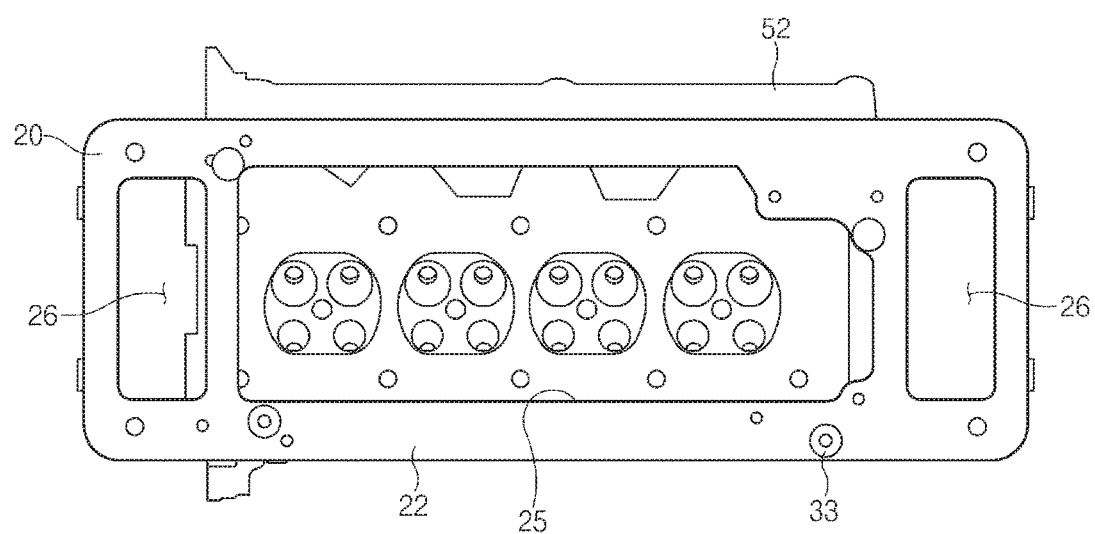
FIG. 6 is a bottom view illustrating a state in which a different type of cylinder head is supported by a second post of a subplate, viewed in a direction indicated by the arrow "B" of FIG. 5.

The plurality of second posts 32 may protrude from the first surface 21 of the subplate 20 and have a second length h2 shorter than the first length h1. For example, as illustrated in FIGS. 5 and 6, a cylinder head 52 of the Kappa Engine may be supported by the plurality of second posts 32.

Figure 7:
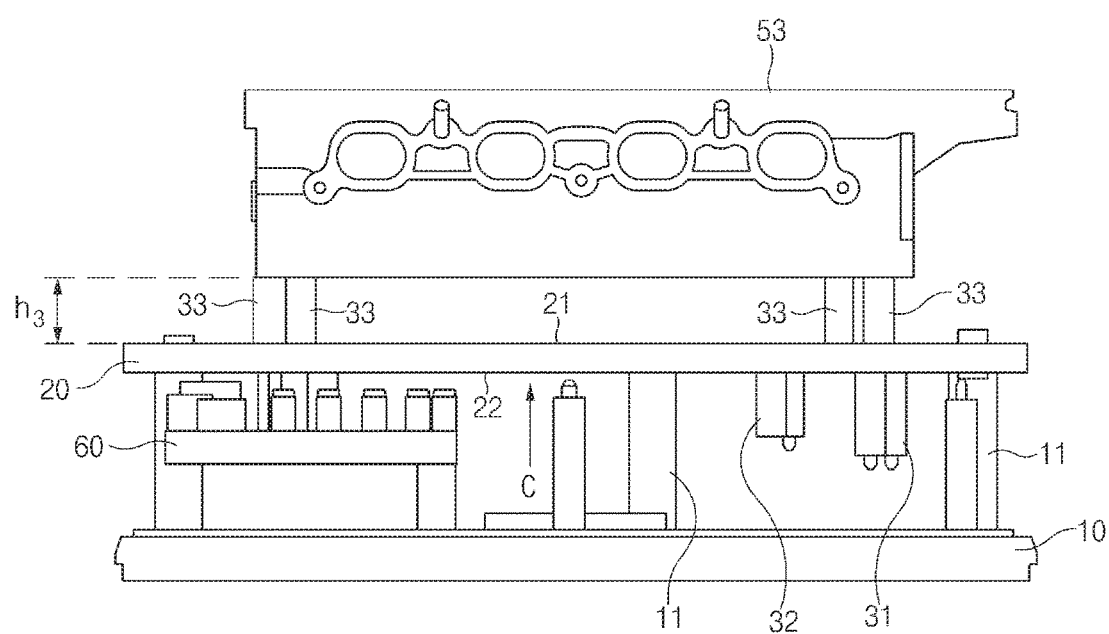
FIG. 7 is a front view illustrating a state in which a different type of cylinder head is supported by a third post of a subplate of a cylinder head pallet according to embodiments of the present disclosure.
Figure 8:
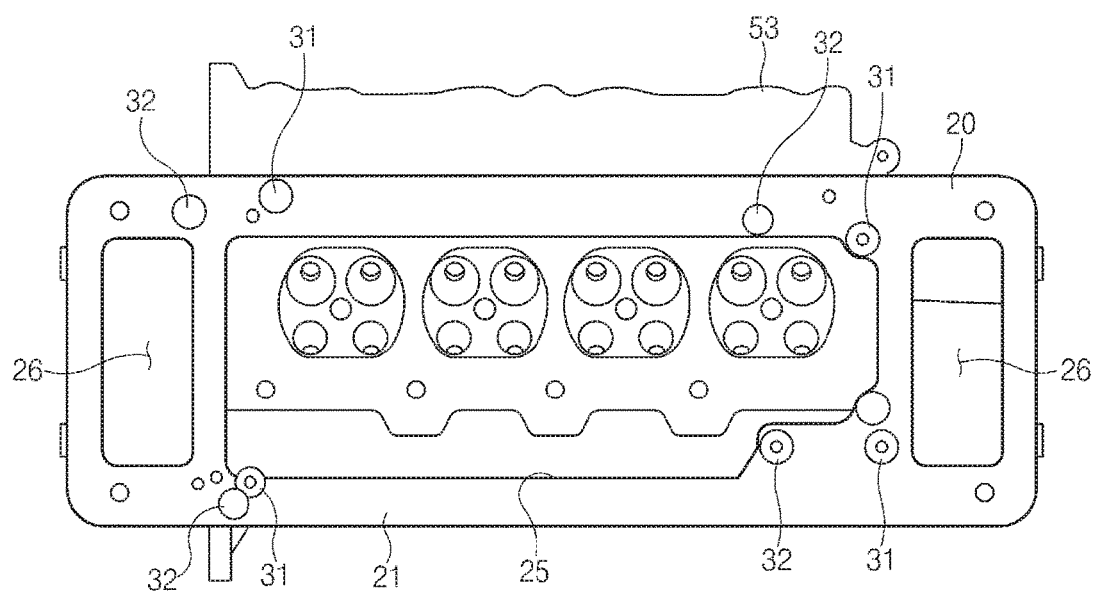
FIG. 8 is a bottom view illustrating a state in which a different type of cylinder head is supported by a third post of a subplate, viewed in a direction indicated by the arrow "C" of FIG. 7.

The plurality of third posts 33 may protrude from the second surface 22 of the subplate 20 and have a third length h3. For example, as illustrated in FIGS. 7 and 8, a cylinder head 53 of the Gamma Engine may be supported by the plurality of third posts 33.

The subplate 20 has a first opening 25 having a predetermined area and extending through the first surface 21 and the second surface 22. Accordingly, as illustrated in FIGS. 4, 6, and 8, when the cylinder heads 51, 52, and 53 are supported by the posts 31, 32, and 33 of the subplate 20, lower surfaces of the cylinder heads 51, 52, and 53 may be exposed through the first opening 25, and accessories such as a valve, a cam cap, a cam carrier, and a cotter may be easily assembled to the cylinder heads 51, 52, and 53 through the first opening 25. That is, the first opening 25 may be used to assemble an accessory.

A pair of second openings 26 are symmetrically provided on both left and right sides of the subplate 20. Also, a pair of second openings are symmetrically provided on both sides of the first opening 25. The user may grip the second openings 26 to reverse and easily install the subplate 20. The second openings 26 may have an area smaller than that of the first opening 25. That is, the second openings 26 may be used as a handle of the subplate 20.

The base plate 10 may have the opening 15 having a predetermined area. The opening 15 of the base plate 10 may correspond to the first opening 25 of the subplate 20. Accordingly, various accessories may be easily assembled to a cylinder head through the opening 15 of the base plate 10 and the first opening 25 of the subplate 20.

Additionally, according to embodiments of the present disclosure, the subplate 20 may be installed to be rotatable by a rotary mechanism (not shown). Thus, a reference portion 28 may be provided on at least one side of the subplate 20 in order to define a rotation axis of the subplate 20.

According to embodiments, the reference portion 28 may be provided as a pair of bushes 28 symmetrically formed on both left and right sides of the subplate 20.

Each of the bushes 28 may have an insertion recess 28a into which a coupling pin (e.g., reference pin) of the rotary mechanism is inserted. When the coupling pin (e.g., reference pin) of the rotary mechanism is inserted into the insertion recess 28a of the bush 28, the subplate 20 may be rotated by the rotary mechanism, and accordingly, the first surface 21 and the second surface 22 of the subplate 20 may be simply reversed and various accessories may be easily assembled to the cylinder head supported by the subplate 20.

Figure 2:
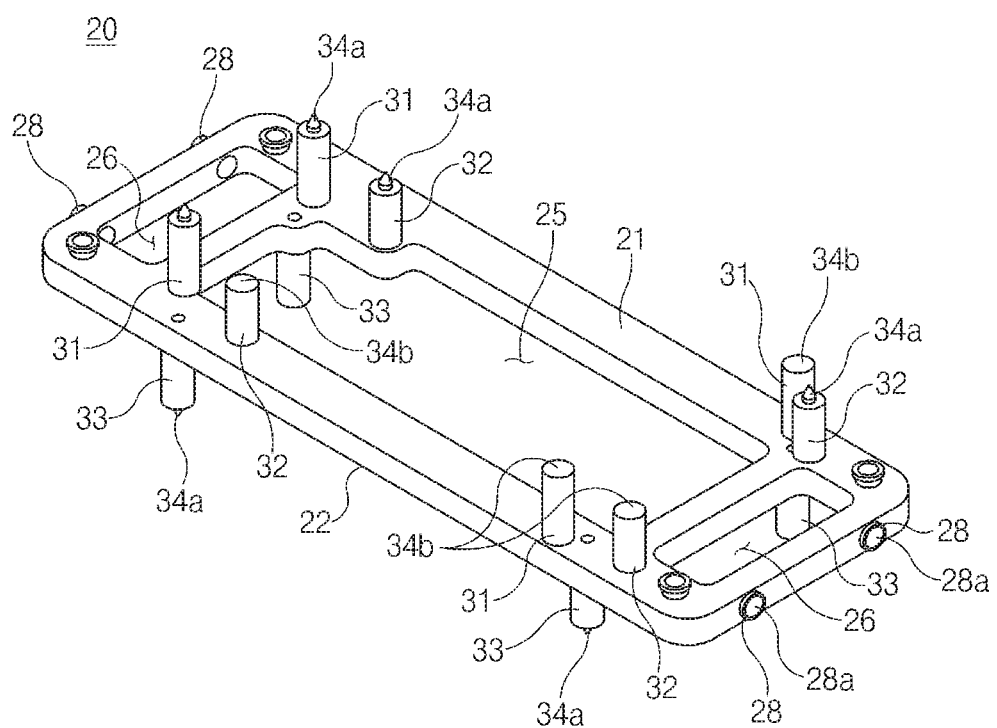
FIG. 2 is a perspective view illustrating a subplate of a cylinder head pallet according to embodiments of the present disclosure.

Referring now to FIG. 2, two pairs of bushes 28, that is, four bushes 28, may be provided on both left and right sides of the subplate 20, and accordingly, the subplate 20 may be stably mounted on a rotary mechanism and a precise rotation axis may be defined.

A nest 60 for a cam cap may be installed on the other side of the base plate 10, and two or more types of cam caps may be mounted on the nest 60 for a cam cap.

A plurality of second supports 12 protrude upwardly from the other side of the base plate 10, and the nest 60 for a cam cap may be supported by the plurality of second supports 12 and upwardly spaced apart from the base plate 10.

A plurality of insertion holes 61 may be provided on the nest 60 for a cam cap, and pins of different types of cam caps 71, 72, and 73 may be inserted into the plurality of insertion holes 61. Accordingly, the cam caps 71, 72, and 73 may be mounted on the nest 60 for a cam cap individually according to assembly conditions thereof.

Figure 9:
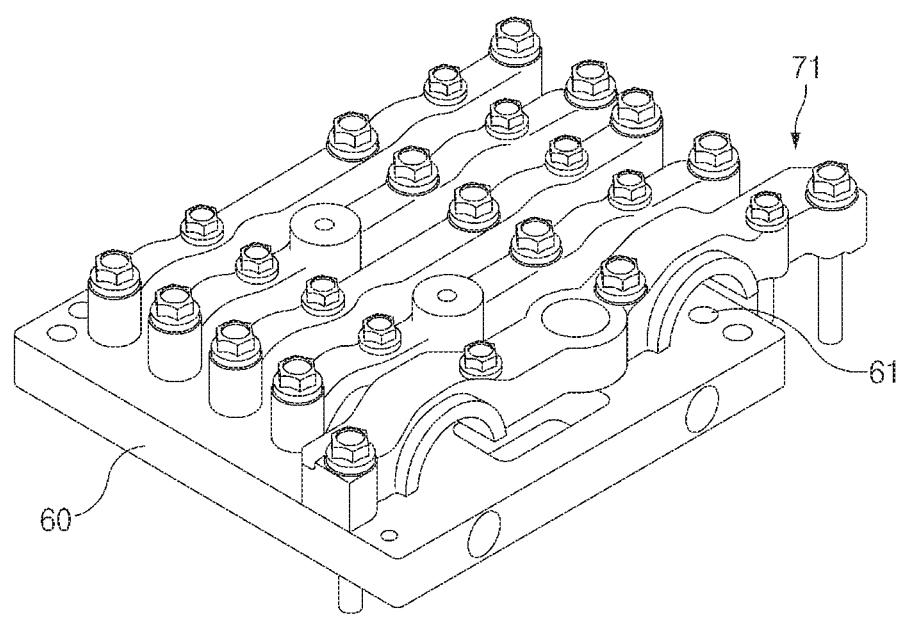
FIG. 9 is a perspective view illustrating a state in which a certain type of cam cap is supported by a cam cap nest of a cylinder head pallet according to embodiments of the present disclosure.
Figure 10:
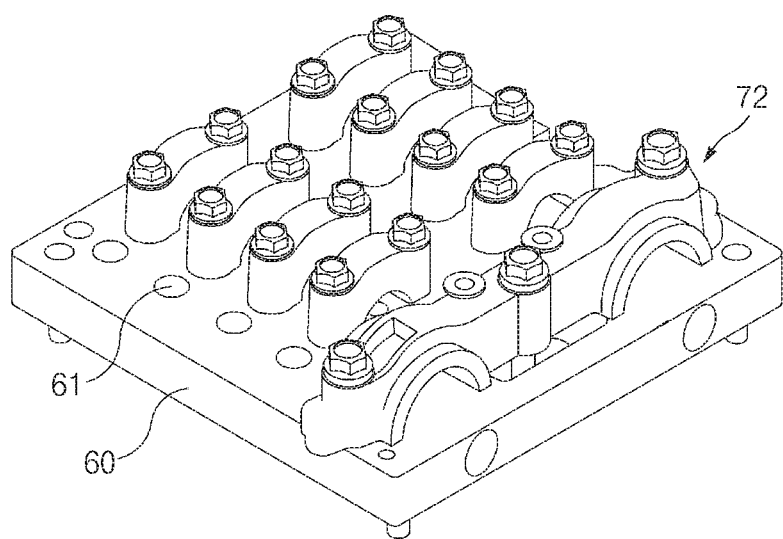
FIG. 10 is a perspective view illustrating a state in which a different type of cam cap is supported by a cam cap nest of a cylinder head pallet according to embodiments of the present disclosure.
Figure 11:
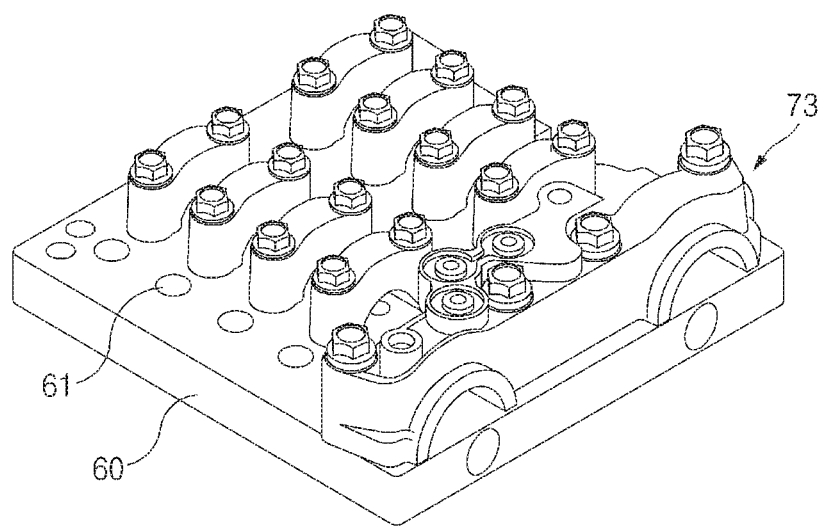
FIG. 11 is a perspective view illustrating a state in which a different type of cam cap is supported by a cam cap nest of a cylinder head pallet according to embodiments of the present disclosure.

For example, FIG. 9 illustrates a state in which the cam cap 71 of the Nu Engine is mounted on the nest 60 for a cam cap, FIG. 10 illustrates a state in which the cam cap 72 of the Kappa Engine is mounted on the nest 60 for a cam cap, and FIG. 11 illustrates a state in which the cam cap 73 of the Gamma Engine is mounted on the nest 60 for a cam cap.

A nest 80 for a cam carrier, allowing a cam carrier to be mounted thereon, may be installed on the base plate 10. For example, the nest 80 for a cam carrier may be advantageously utilized when a cam carrier of the Nu Engine is mounted thereon.

As described above, according to embodiments of the present disclosure, since the cylinder head pallet may flexibly cope with a type and an assembly posture of a cylinder head, the cylinder head pallet may be easily utilized in assembling various types of cylinder heads and a cylinder head having a changed structure. Also, when various accessories are assembled to the cylinder head, interference thereof may be simply avoided. Thus, assembly characteristics may be significantly enhanced.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cylinder head pallet comprising:
a base plate;
a subplate disposed upwardly of the base plate, spaced apart from the base plate, and having a first surface and a second surface that oppose each other;
a plurality of posts installed on the first surface and the second surface of the subplate to support a cylinder head; and
a plurality of supports installed to protrude upwardly from an upper surface of the base plate,
wherein the subplate is supported by the plurality of supports, and
wherein the plurality of posts include:
a plurality of first posts protruding from the first surface of the subplate and having a first length;
a plurality of second posts protruding from the first surface of the subplate and having a second length shorter than the first length; and
a plurality of third posts protruding from the second surface of the subplate and having a third length.

2. The cylinder head pallet according to claim 1, wherein the subplate is detachably mounted on the plurality of supports.

3. The cylinder head pallet according to claim 1, wherein the plurality of posts are disposed to support two or more types of cylinder heads.

4. The cylinder head pallet according to claim 1, wherein the subplate has a first opening having a predetermined area and extending through the first surface and the second surface.

5. The cylinder head pallet according to claim 4, wherein the subplate has a pair of second openings symmetrically provided on both sides of the first opening.

6. The cylinder head pallet according to claim 1, wherein at least one of the plurality of posts has a reference pin protruding from an upper surface thereof, and upper surfaces of the other posts are flat.

7. The cylinder head pallet according to claim 1, wherein the base plate has an opening having a predetermined area.

8. The cylinder head pallet according to claim 1, further comprising:
a nest for a cam cap installed on the base plate and allowing different types of cam caps to be mounted thereon.

9. The cylinder head pallet according to claim 8, wherein the base plate further includes a plurality of second supports installed to protrude upwardly, and the nest for the cam cap is disposed upwardly of the base plate and spaced apart from the base plate by the plurality of second supports.

10. The cylinder head pallet according to claim 1, further comprising:
a nest for a cam carrier installed on the base plate and allowing a cam carrier to be mounted thereon.

11. A cylinder head pallet comprising:
a base plate;
a rotatable subplate disposed upwardly of the base plate and spaced apart from the base plate;
a plurality of posts protruding from an upper surface and a lower surface of the subplate and selectively supporting two or more types of cylinder heads;
at least one pair of bushes symmetrically formed on both left and right sides of the subplate; and
a plurality of supports installed to protrude upwardly from an upper surface of the base plate,
wherein the subplate is supported by the plurality of supports, and wherein the plurality of posts include:
- a plurality of first posts protruding from the first surface of the subplate and having a first length;
- a plurality of second posts protruding from the first surface of the subplate and having a second length shorter than the first length; and
- a plurality of third posts protruding from the second surface of the subplate and having a third length.

12. The cylinder head pallet according to claim 11, wherein the at least one pair of bushes have an insertion recess.

13. The cylinder head pallet according to claim 11, wherein the subplate has an opening having a predetermined area and extending through the subplate vertically.

* * * * *